US007558153B2

(12) United States Patent
Zeroug et al.

(10) Patent No.: US 7,558,153 B2
(45) Date of Patent: Jul. 7, 2009

(54) RADIAL PROFILING OF SLOWNESS: METHODS AND APPARATUS FOR NEAR-WELLBORE ALTERATION ESTIMATION

(75) Inventors: Smaine Zeroug, Paris (FR);
Henri-Pierre Valero, Danbury, CT (US);
Sandip Bose, Chestnut Hill, MA (US)

(73) Assignee: Schlumberger Technology Corporation, Ridgefield, CT (US)

( * ) Notice: Subject to any disclaimer, the term of this patent is extended or adjusted under 35 U.S.C. 154(b) by 26 days.

(21) Appl. No.: 11/286,790

(22) Filed: Nov. 23, 2005

(65) Prior Publication Data
US 2006/0233047 A1    Oct. 19, 2006

Related U.S. Application Data

(60) Provisional application No. 60/672,565, filed on Apr. 19, 2005.

(51) Int. Cl.
*G01V 1/40* (2006.01)
(52) U.S. Cl. .......................................... 367/27; 367/31
(58) Field of Classification Search ............. 367/25–28, 367/31, 35; 181/105; 702/6, 11
See application file for complete search history.

(56) References Cited

U.S. PATENT DOCUMENTS

| 5,081,611 | A | | 1/1992 | Hornby | ....................... 367/25 |
|---|---|---|---|---|---|
| 5,197,038 | A | | 3/1993 | Chang et al. | ................... 367/28 |
| 5,754,493 | A | * | 5/1998 | Al-Chalabi | ................... 367/38 |
| 6,169,959 | B1 | * | 1/2001 | Dragoset Jr. | .................. 702/17 |
| 6,351,991 | B1 | * | 3/2002 | Sinha | ....................... 73/152.01 |
| 6,526,354 | B2 | | 2/2003 | Bose et al. | |
| 6,614,716 | B2 | * | 9/2003 | Plona et al. | .................... 367/31 |
| 2002/0116128 | A1 | * | 8/2002 | Sinha et al. | ..................... 702/6 |
| 2003/0010494 | A1 | | 1/2003 | Bose et al. | ............... 166/254.2 |
| 2005/0128872 | A1 | | 6/2005 | Valero et al. | |

FOREIGN PATENT DOCUMENTS

| GB | 2 374 932 A | 10/2002 |
|---|---|---|
| GB | 2 399 636 A | 9/2004 |

OTHER PUBLICATIONS

Dushaw, et al. "Ray Tracing for Ocean Acoustic Tomography." APL-UW TM 3-98, Dec. 1998.*
Xu, et al. "Depth solution from borehole and travel time data using three-variable hypersurface splines." Journal of Applied Geophysics 46 (2001).*
Sinha, et al. "Radial Profiling of Formation Shear Velocity from Borehole Flexural Dispersions." 2001 IEEE Ultrasonics Symposium.*

(Continued)

*Primary Examiner*—Jack W. Keith
*Assistant Examiner*—Scott A Hughes
(74) *Attorney, Agent, or Firm*—Helene Raybaud; Vincent Loccisano; Jody Lynn DeStefanis

(57) ABSTRACT

Methods and apparatus facilitating radial profiling of acoustic slowness of a formation traversed by a borehole are disclosed. According to some aspects of the invention, a radial slowness profile is imaged, including an image of altered region slowness.

29 Claims, 10 Drawing Sheets

OTHER PUBLICATIONS

Combined Search and Examination Report under Section 17 and 18(3) dated Jul. 19, 2006 from the UK Patent Office for Application No. GB0605517.2.

Maurice Kendall and Alan Stuart, "Interval Estimation: Confidence Intervals", The Advance Theory of Statistics, vol. 2 Inference and Relationship, 1979, Chapter 20, pp. 109-146.

Henri-Pierre Valero et al., "Improved First-Motion Algorithm to Compute High-Resolution Sonic Log", SPE 90995, Copyright 2004, Society of Petroleum Engineers Inc.

Christopher V. Kimball and Thomas L. Marzetta, "Semblance processing of borehole acoustic array data", Geophysics, vol. 49, No. 3 (Mar. 1984); pp. 274-281.

Christopher V. Kimball, "Shear Slowness Measurement by Dispersive Processing of the Borehole flexural mode", Geophysics, vol. 63, No. 2 (Mar.-Apr. 1998); pp. 337-344.

Brian E. Hornby, "Tomographic Reconstruction of near-borehole slowness using refracted borehole sonic arrivals", Geophysics, vol. 58, No. 12 (Dec. 1993); pp. 1726-1738.

Kris A. Dines and R. Jeffrey Lytle, "Computerized Geophysical Tomography", Proceedings of the IEEE, vol. 67, No. 7, Jul. 1979.

* cited by examiner

RADIAL PROFILING OF SLOWNESS: METHODS AND APPARATUS FOR NEAR-WELLBORE ALTERATION ESTIMATION

CROSS-REFERENCE TO RELATED APPLICATION

This application claims benefits of priority from U.S. Provisional Patent Application No. 60/672,565, entitled RADIAL PROFILING OF COMPRESSIONAL SLOWNESS: A TOOL FOR NEAR-WELLBORE ALTERATION ESTIMATION, filed on Apr. 19, 2005, which is commonly assigned to assignee of the present invention and hereby incorporated by reference in its entirety.

FIELD OF THE INVENTION

The present invention relates generally to sonic or acoustic logging of earth formations surrounding a borehole. More particularly, the present invention relates to methods and apparatus for determining radial variations in compressional or shear slowness of formations surrounding a borehole.

BACKGROUND OF THE INVENTION

The main purpose of borehole sonic logging is to provide an estimate of the formation slowness. If a monopole source is excited in the borehole, it is possible to obtain the compressional and shear slowness of fast and intermediate formations, in which the rock slowness is less than the borehole fluid slowness. A standard method of extracting the compressional slowness is to use the standard coherence approach. C. V. Kimball and T. L. Marzetta, *Semblance processing of borehole acoustic array data*, GEOPHYSICS vol. 49, no. 3, pp. 274-281 (1984). In slow formations, when the shear slowness is greater than that of the fluid, the dipole source is used and measurement of the dipole flexural mode allows the estimation of the shear slowness of the formation. In this case, semblance processing is still applied, but it integrates the dispersive behavior of the dipole flexural mode. C. V. Kimball, *Shear slowness measurement by dispersive processing of the borehole flexural mode*, GEOPHYSICS vol. 63, no. 2, pp. 337-344 (1996).

Until now, the main outputs extracted from waveforms recorded by a high-frequency monopole source were the compressional slowness of the formation and sometimes the shear depending on the formation (fast and intermediate formations). Nevertheless, the development of new complex fields, where wellbore stability and optimal well completion are of key importance, requires more information than the traditional standard log curves provide. One of the current main interests is in acquiring the radial formation slowness profile of a formation from shallow to deep. For example, a completion engineer is interested to learn of the possible existence of an altered zone around the well that may have a bearing on perforation design, and a geophysicist may want to know the measurement of the far compressional slowness beyond the altered formation. To provide this information, it is necessary to provide compressional and shear slowness profiles as a function of the radial distance into the formation.

In the monopole case, the ability to record such information is strongly related to the characteristics of the tool that will record the data. In fact, the depth of penetration into the formation is a function of the distance between the transmitter and the first receiver in the array, the frequency content of the emitted signal, and the array aperture. Therefore, to accommodate various depths of investigation of the emitted signal, a tool may contain multiple transmitters located at various source-to-receiver (TR) spacings combined with a sufficiently large array aperture.

In 1993, Hornby (B. Hornby, *Tomographic reconstruction of near-borehole slowness using refracted borehole sonic arrivals*, GEOPHYSICS vol. 58, pp. 1726-1738 (1993)) presented a method for reconstructing a 2D map of near-borehole slowness by inverting the first arrival time of compressional head waves by using the simultaneous iterative reconstruction technique (SIRT). K. A. Dynes and R. J. Lytle, *Computerized geophysical tomography*, PROC. INST. ELECT. AND ELECTROM. ENG., vol. 67, pp. 1065-1073 (1979). This proposed inversion technique has been found to be quite sensitive with respect to the choice of the initial slowness model needed to start the inversion and also with respect to mud slowness and borehole diameter.

Accordingly, some aspects of the present invention relate to methods and apparatus for estimating a 2D (axial and radial) or 3D image of the formation compressional or shear slowness, in real time and with minimal user interaction. The inversion scheme may be based on a simple analytical expression linking the estimated transit time to the slowness variation around the wellbore. This simple formulation of the problem may enable fast and easy inversion making this product suitable for well site implementation. The methods and apparatus may invert for a varying profile when the slowness decreases monotonically with radial distance in the formation. The methods and apparatus described herein may not be sensitive to the mud, borehole diameter, and initial background slowness. Selected examples of data recorded with a new wireline tool suitable for compressional tomography analysis are presented to demonstrate the robustness and reliability of the proposed radial profiling technique.

SUMMARY OF THE INVENTION

The present invention addresses the above-described deficiencies (e.g. sensitivity to mud slowness and borehole diameter, dependency on initial background slowness, no real time depth by depth output) and others. Specifically, the present invention provides methods and apparatus for radial slowness profiling. The methods and apparatus enable imaging slowness profiles in an altered zone of a formation traversed by a borehole.

One aspect of the invention provides a method of logging an earth formation surrounding a borehole. The method comprises providing a logging device that is moveable through the borehole, transmitting sonic energy into the formation, and receiving, at a plurality of transmitter-to-receiver spacings on the logging device, sonic energy that has traveled through the formation. The method further includes producing signals representative of the received sonic energy for the plurality of transmitter-to-receiver spacings, and providing a continuous radial profile image of formation slowness. The continuous radial profile image of formation slowness may comprise providing near, far, and intermediate formation slowness as a function of radius. The continuous radial profile image of formation slowness may comprise providing formation slowness as a function of radius at at least three radial locations.

According to some aspects, providing the continuous radial profile image of formation slowness comprises providing formation slowness as a function of radius at regular or irregular radii intervals, the intervals ranging between about 0.1 and, in general, 36 inches (although not necessarily limited to 36 inches).

According to some aspects, the method of logging an earth formation surrounding a borehole further comprises determining, from the signals, differential transit times for the respective transmitter-to-receiver spacings. The differential transit times for the respective transmitter-to-receiver spacings may be fit to a spline function of the transmitter to receiver spacing. The method may also include transforming these spline-fitted differential transit times via an inversion module to a profile of slowness as a function of borehole radius. The method may include imaging the inverted profile. The transforming may comprise an iterative inversion scheme. The iterative inversion scheme may comprise (a) starting with an initial radially-layered formation model with an initial layer thickness profile provided by a first implementation of the inversion module as described above; (b) computing a time of flight for a wave traveling from a transmitter to a receiver based on the initial formation model; (c) computing a formation slowness for the initial model based on the computed time of flight; (d) measuring formation slowness; and (e) comparing the computed formation slowness to the measured formation slowness. If the difference between the computed formation slowness and the measured formation slowness is within a predetermined error tolerance, the initial model is assigned as a final model and stopping the iterative scheme. If the difference between the computed formation slowness and the measured formation slowness is outside the predetermined error tolerance, then the initial formation model is updated with a new radial formation layer thickness profile. Steps (b)-(e) may be repeated for the updated formation model until the difference between the computed formation slowness and the measured formation slowness is within the predetermined tolerance. Measuring formation slowness according to step (d) means computing slowness from data fitting according to received waveform data.

According to some aspects, the method of logging an earth formation surrounding a borehole further comprises: (a) determining, from the signals, differential transit time data for the respective transmitter-to-receiver spacings; (b) computing a monotonic spline basis function from the transmitter-to-receiver spacings corresponding to the differential transit time data; (c) computing a weighted least squares fit of the differential transit times data on the spline basis function and weights based on a differential transit times variance; (d) checking coefficients of the least squares fit; if the coefficients are greater than or equal to zero, identifying the least squares fit as a best fit; if any of the coefficients are less than zero, repeating steps (c)-(d) until a non-negative condition of the coefficients is satisfied or a maximum number of iterations is triggered; (e) if a maximum number of iterations of steps (c)-(d) is triggered, applying a constant fit to the differential transit times data; (f) transforming fitted differential transit times versus transmitter-to-receiver spacings to an inverted profile of slowness as a function of borehole radius; (g) imaging the inverted profile.

According to some aspects, the method of logging an earth formation surrounding a borehole further comprises providing a continuous radial profile image of formation slowness in real time depth by depth.

According to some aspects, the method of logging an earth formation surrounding a borehole comprises providing a 3D continuous radial profile image of formation slowness. Providing the 3D image may include collecting multiple waveforms at each of multiple azimuthal locations, generating one radial profile for each azimuthal location, and combining the profiles at each azimuthal location. Each one of the radial profiles may comprise a slowness map (r, z) at each azimuthal angle, theta. In another aspect, generating one radial profile for each azimuthal location may require compensating first for tool rotation such that the azimuth referrs to the formation and not to the rotating tool.

Another aspect of the present invention provides a method of logging an earth formation surrounding a borehole, the method comprising providing a logging device that is moveable through the borehole, transmitting sonic energy into the formation and receiving, at a plurality of transmitter-to-receiver spacings on the logging device, sonic energy that has traveled through the formation, and providing a 2D image of formation slowness in an altered radial zone of the formation. Providing the 2D image of formation slowness may comprise providing near, far, and intermediate formation slowness as a function of radius. Providing the 2D image of formation slowness may comprise providing the image in real time. Providing the 2D image of formation slowness may comprise providing formation slowness discrete length by discrete length, or inch-by-inch, as a function of radius. Providing the 2D image of formation slowness may comprise providing formation slowness discreet radius length by discrete radius length at multiple depths.

Some aspects of the method may include producing signals representative of the received sonic energy for the plurality of transmitter-to-receiver spacings, determining, from the signals, differential transit time data for the respective transmitter-to-receiver spacings, fitting the differential transit times data to a spline function profile of the transmitter-to-receiver spacing, and transforming the spline fitted differential transit times via a profile of slowness as a function of borehole radius.

Another aspect of the present invention provides a method of profiling a formation traversed by a borehole, comprising logging near borehole formation slowness, logging far field formation slowness, and logging intermediate formation slowness as a function of radius. Logging intermediate formation slowness as a function of radius may comprise logging a plurality of formation slowness values of the formation at radii between the near and far formation slownesses. Logging intermediate formation slowness as a function of radius may comprise logging slowness variation radially between the near and far fields. Logging intermediate formation slowness as a function of radius may comprise logging slowness variation radially at spaced intervals between the near and far fields. Logging intermediate formation slowness as a function of radius may comprise logging slowness variation in an altered zone of the formation. The method may also include logging intermediate formation slowness as a function of radius depth by depth at a plurality of depths, and generating a 2D image of slowness as a function of radius in real time at a selected depth.

Another aspect of the present invention provides an apparatus for logging a formation traversed by a borehole, comprising a body, a plurality of transmitters transmitting sonic energy into the formation, a plurality of receivers spaced from the plurality of transmitters for receiving, at a plurality of transmitter-to-receiver spacings on the body, sonic energy that has traveled through the formation, a set of instructions that, when executed, provide a 2D image of formation slowness of an altered radial zone of the formation.

Another aspect of the present invention provides a method of logging an earth formation surrounding a borehole in 3D. The method comprises providing a logging device that is moveable through the borehole, transmitting sonic energy into the formation and receiving, at a plurality of transmitter-to-receiver spacings on the logging device, sonic energy that has traveled through the formation, and providing a 3D image of near, far, and intermediate formation slowness. Providing the 3D image of formation slowness may comprise providing near, far, and intermediate formation slowness as a function of radius, and the 3D image may be provided in real time. The 3D image of formation slowness comprises providing formation slowness discreet length by discreet length as a function of radius. Providing the 3D image of formation slowness may comprise collecting multiple waveforms at each of multiple azimuthal locations, compensating for any tool rotation to ensure that azimuth is referenced to the formation, generating one radial profile for each azimuthal location, and combining the profiles at each azimuthal location.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate aspects of the present invention and are a part of the specification. Together with the following description, the drawings demonstrate and explain the principles of the present invention.

FIG. 2 shows cases for white Gaussian noise with all data points retained, white noise with the removal of 10% of the points due to outlier (gross error) filtering, and white noise with different variances at each sensor.

Figure 1:
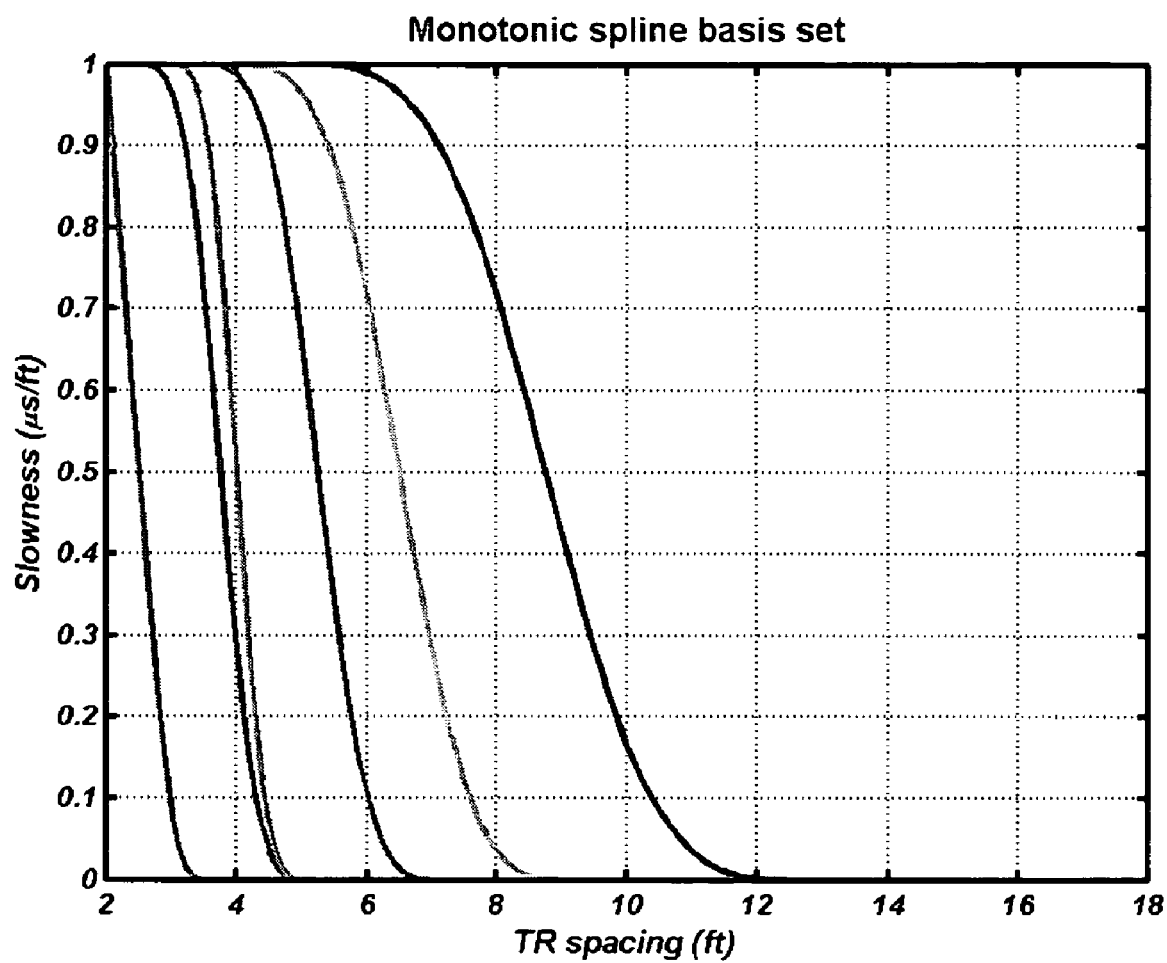
FIG. 1 shows one possible set of spline functions used for the data fitting according to one aspect of the present invention.

Throughout the drawings, identical reference characters and descriptions indicate similar, but not necessarily identical elements. While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the scope of the invention as defined by the appended claims.

DETAILED DESCRIPTION OF THE PREFERRED EMBODIMENTS

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

The present invention contemplates methods and apparatus for radial profiling of formation slowness, and for providing continuous images of formation slowness as a function of radius in real time, particularly of altered regions of a formation surrounding a borehole. In the past, only close and far field slownesses have been provided, with no information between the two extremes. The present invention enables radial profiles of intermediate and altered regions discrete distance by discrete distance radially (such as inch by inch or other distances that may or may not be equal to one another). A tool configuration with a plurality of spacings (short and long) between receivers and transmitters may facilitate the continuous or inch-by-inch radial profile generation.

As used throughout the specification and claims, the terms "borehole" or "downhole" refer to a subterranean environment, particularly in a wellbore. A "continuous" radial profile image means an image of more than just a near and a far radial profile, including an intermediate image too, or radial profile images at at least three radial locations. "Logging" is used broadly to mean running a tool in a subterranean borehole and collecting data. The words "including" and "having," as used in the specification, including the claims, have the same meaning as the word "comprising."

Estimation of near-borehole formation compressional slowness is of significant value for petrophysical and geomechanical applications. Measuring the slowness variation near-borehole can help identify damaged or altered zones, which is valuable information for wellbore stability and optimal well completion. To obtain the properties of the non-altered zone, it is necessary to probe the formation as deeply as possible, which may include use of an acoustic tool with a sufficiently long source-to-receiver (TR) spacing and large array aperture. The principles of the present invention facilitate shallow and deep formation probing. According to some embodiments, sonic tools according to some aspects of the present invention may include multiple monopole and/or other transmitters with short and long TR spacing, wide array aperture, and a wideband source signal. According to some aspects presented herein, refraction of bulk waves, rather than borehole modes, are used. Therefore, the principles described herein are not limited to monopole transmitters. In addition to these hardware enhancements (one example of which is shown and described below with reference to FIGS. 10-11), a robust and automatic inversion scheme that provides a two-dimensional (2D) image of the formation compressional slowness near-borehole may be used. This method can also be applied to monopole shear assuming one can extract the first arrival of this component in a fast or intermediate formation. One inversion technique is based on the inversion of transit times estimated from the waveform recorded by the tool. This inversion scheme can be expressed analytically, making the implementation of the algorithm fast, robust and suitable for a well site environment. The principles of the present invention enable a robust and reliable 2D image of formation compressional slowness variation near-borehole, in real time and with minimal user interaction.

A borehole of radius r filled with a fluid of speed $V_f$ surrounded by a cylindrically layered formation where each layer is characterized by a thickness $H_i$ and a velocity $V_i$ (reciprocal of slowness) is considered. The sequence of $V_i$ is assumed to monotonically increase with increasing radius of the cylindrical layers that need not be uniformly spaced. Each of these layers is probed by a certain TR spacing of transmitter and receiver. Within the TR spacing considered, an assumption is made that there is no axial variation of the compressional wave speed. Assuming that from the compressional measurement at each tool depth position, up to M compressional velocities, $V_i$, (or differential transit times, "DTT"'s) can be estimated, with the associated transmitter-receiver spacing (TR) denoted by $x_i$; i=1, M. The velocity estimates may come from M receiver pairs, with each pair comprising two closely spaced receiving elements, with associated transmitter-receiver spacing given by the distance between the transmitter to the midpoint of the receiver pairs. Prior to developing an inversion scheme to obtain the compressional radial profile from the estimated $V_i$ at $X_i$, it is convenient to consider a forward propagation problem under the assumptions presented earlier.

First, the expression of the minimum TR spacing to probe a certain layer is defined. A ray, launched from a transmitter located at standoff s from a fluid-rock interface turns at a given interface between layer i−1 and i when the incidence angle $\alpha_i$ at the first (fluid-rock) interface is equal to or larger than $\alpha_i = \sin^{-1}[v_f/v_i]$. To capture this refracted ray when it emerges in the borehole fluid, a minimum TR spacing $x_i^{min}$ is needed:

$$x_i^{min} = 2s\left(\frac{V_i^2}{v_f^2} - 1\right)^{-\frac{1}{2}} + 2\sum_{j=1}^{i-1} H_j\left(\frac{V_i^2}{V_j^2} - 1\right)^{-\frac{1}{2}}, i = 2, 3, \ldots \quad (1)$$

Knowing the minimal TR spacing, it is possible to define the radial depth of investigation into the formation. Suppose the largest TR spacing available on the receiver array is $X_{max}$, the deepest layer investigated by the captured refracted signal at $X_{max}$ is the lth layer at depth $z_l$, with l defined implicitly by:

$$x_l^{min} < X_{max} < x_{l+1}^{min} \quad (2)$$

The earliest ray arriving at a particular TR position $X_i$ depends on the wave speed profile considered. Because many rays can travel from the transmitter to the receiver via various paths, the one that takes the shortest time is considered. To find the possible number of rays arriving at $X_i$, $X_i$ is compared to the minimum TR spacing $$x_i^{min}$$

needed to probe the various layers. If $$x_K^{min} < X_i < x_{K+1}^{min},$$

then K (headwave) rays will arrive and their time of flight (TOF) values (indexed by j in the equation below) will be given by:

$$TOF_j = \frac{2s}{v_f}\left[1 - \frac{v_f^2}{V_j^2}\right]^{1/2} + 2\sum_{k=1}^{j-1} \frac{H_k}{V_k}\left[1 - \frac{V_k^2}{V_j^2}\right]^{1/2} + \frac{X}{V_j}; \quad (3)$$

$$j = 1, K$$

Among these TOFs, the shortest is assigned to X, i.e., $$TOF = \text{Min}(TOF_j, j=1, K) \quad (4)$$

where K is defined by the condition, $$x_K^{min} < X < x_{K+1}^{min}$$

Given that a velocity estimate $V_i$ can be obtained from the TOFs at two neighboring receivers with TR spacing at their mid-point $X_i$, the relationships above define a relation between $X_i$ and $V_i$ as follows:

$$X_i = 2sD_{v_f,V_i}^{-\frac{1}{2}} + 2\sum_{j=1}^{i-1} H_j D_{V_j,V_i}, i = 1, M \quad (5)$$

where $$D_{V_j,V_i} = \left(\frac{V_i^2}{V_j^2} - 1\right)^{-\frac{1}{2}} \quad (6)$$

and where it is assumed that velocity estimate $V_i$ is different and larger than velocity estimate Vj.

With the previous expression between $X_i$ and $V_i$ known, the estimation of $H_i$ is straightforward and can be written as:

$$H_i = \frac{(X_{i+1} - X_i) - 2s[D_{v_f,V_{i+1}} + D_{v_f,V_i}]}{2D_{V_i,V_{i+1}}} - \frac{\sum_{j=1}^{i-1} H_j[D_{V_f,V_{i+1}} + D_{V_f,V_i}]}{D_{V_i,V_{i+1}}}, \quad (7)$$

$$i = 2, M - 1; V_{i+1} - V_i > \varepsilon.$$

where $\varepsilon$ is some small positive number for which the division in (7) remains accurate (within the machine precision). The condition between Vi+1 and Vi specifies that slowness be a monotonically-increasing function of TR spacing.

One practical implementation of this method or algorithm is now presented. First, the method or algorithm may rely on a robust estimation of the transit time of the compressional head wave (see, e.g., U.S. patent application Ser. No. 10/819, 362 for "Methods and Systems for Detecting Arrivals of Interest" filed Apr. 6, 2004, hereby incorporated in its entirety by this reference; see also H. P. Valero et al., *Improved First-Motion Algorithm to Compute High-Resolution Sonic Log*, EXTENDED ABSTRACT: SPE INTERNATIONAL PETROLEUM CONFERENCE IN MEXICO, SPE 90995 (2004)) that is used in this framework. To minimize the borehole effects (shape, etc.), the DTT is computed for various pairs of receivers and transmitters. The DTT is plotted versus TR spacing $(X_i)$ and a fit (e.g. spline fitting as described below) is performed on the DTT estimate. The result of the fit is fed into the inversion scheme that is described above.

Iterative scheme: One way to verify whether the inverted set of layer thicknesses $H_i$ with corresponding wave speeds $V_i$; =1, M is a satisfactory solution of the problem may comprise computing the corresponding set of TOF (Eq. (3)) at the same receiver locations used originally. From the computation of the TOFs, a set of velocities $\overline{V}_i$ is estimated. If the difference between $\overline{V}_i$ and the originally measured velocities $V_i$ is not less than a prescribed error, then the set $H_i$ is updated to $H_i^I$ and the corresponding estimated velocities $\underline{V}_i^I$ are recomputed and compared to $V_i$. Elements of $H_i$ are updated into $H_i^I$ in such a way that the elements of $\overline{V}_i^I$ approach the corresponding elements of $V_i$. Following this approach, an iterative scheme can be set up whereby the set $H_i^I$ is updated until $\overline{V}_i^I$ is close (i.e., within a tolerated error) to $V_i$. This iterative scheme has been found to be adequate to compensate for the error in transit time estimation arising from using the approximate high-frequency ray tracing approach (via comparison with data estimated from full-waveform mathematical forward modeling). This iterative scheme results in the 2D image of the compressional slowness of the formation near-well bore (also valid for shear arrival if present in the data).

The differential transit times input into the aforementioned ray-based profiling scheme are noisy in practice. Therefore, a pre-processing step is described below in which the ray differential transit time values are smoothed while preserving the monotonic trend with TR spacing required by the theory. The smoothing is based on fitting to splines which are specially designed to be monotonic and to capture the salient variation in the differential transit time with TR spacing.

FIG. 1 shows one possible set of spline functions used for the fitting. These are suitable for typical variations in the measured DTT with TR spacing. While a better choice of function set is possible for a particular profile of slowness the proposed set may be adopted as a good compromise for typical profiles that are encountered.

Using the spline basis defined above, the best fit solution to the given data points of DTT is calculated. The decreasing monotonic condition on the slowness (or DTT) trend with TR can be easily shown to be satisfied by a corresponding non-negative constraint on the coefficients for the spline fit.

The rigorous solution to this problem requires the use of a constrained optimizer. In practice, excellent results are obtained, for example, by using an approach inspired by the application of the Kuhn-Tucker conditions for the constrained optimum and described by the following algorithm:
1. Compute the monotonic spline basis $B_s$ on the TR values corresponding to the available DTT data. This step can be done in advance.
2. Compute the weighted least squares fit of the DTT data on the spline basis and weights based on the DTT variance, if supplied.
3. If all of the coefficients in the best fit are greater than or equal to 0, STOP. The best monotonic fit has been identified.
4. If some coefficients are <0, remove the corresponding basis functions from Bs and repeat step 2 until the non-negative condition is satisfied or a specified maximum number of iterations is reached (return constant fit in that case).

A confidence indicator may be calculated in conjunction with the radial profiling product implemented by a ray-based method described herein and hereafter referred to as RayProf. The confidence indicator may be the counterpart of the alteration flag in U.S. Pat. No. 6,526,354 ("the '354 patent," which is hereby incorporated in its entirety by this reference) to Bose. As mentioned in the '354 Patent, it is the test statistic corresponding to a hypothesis test where the presence of an altered profile is tested for. In particular, the one input to RayProf is tested against the constant hypothesis.

The alteration detector is set up to solve a hypothesis testing problem based on the differential transit times (DTT) described above. The alteration detector seeks to decide between the hypotheses as set out below:

H0: DTT=constant

H1: DTT=decreasing trend with TR

In reality, the detector has to contend with measurement errors. It is sufficient at this stage to understand that noise (errors) has been incorporated into the model and the hypothesis testing problem has been solved. The alteration detector described in the '354 patent was developed to test for a much simpler case, specifically for a linear and piecewise linear and constant variation of DTT with TR which were deemed the simplest fits consistent with the hypothesis H1 and the physics of probing up to the virgin zone.

The hypothesis testing problem may be extended to the monotonic spline (smoothed) fit for the DTT that is used as the input to the radial profiling algorithm RayProf. In other words, the above hypothesis case may be updated as follows:

H0: $DTT=s+N$

H1: $DTT=s_{msp}(\underline{TR})+N$ where $s_{msp}(TR)$ is the monotonic spline-fit, N is the measurement error (noise) and the underlining refers to the vector nature of DTT whose components are the DTT values at different TR spacings (for a certain aligned depth).

A Generalized Likelihood Ratio Test (GLRT) may be used for the composite hypothesis testing problem (in which there are unknown parameters such as the constant deep reading and the profile in the problem above.) This involves maximizing the likelihood under each hypothesis and taking the ratio of these maximized likelihoods to generate a test statistic that is compared to a threshold. Recall that the likelihood is simply the PDF (probability density function) of the observations given the value of the probability density parameters expressed as a function of those parameters.

The GLRT can therefore be solved for certain error models. In particular, if the errors are modeled as independent, identically distributed (i.i.d.) Gaussian with unknown variance (in practice due to the possible presence of gross errors, a mixture model may be more appropriate for the present problem; however, since a filter is used to remove these outliers, the retained points can be modeled as described by a Gaussian distribution), the following test statistic can be obtained:

$$T_m(DTT) = \frac{\sum_{i}^{M}(DTT_i - \overline{DTT})^2}{\min_{m_{msp}} \sum_{i}^{M}(DTT_i - DTT_{msp_i})^2} \qquad (8)$$

where $\overline{DTT}=1' \cdot DTT/M$ is the preferred constant fit, $m_{msp}$ refers to the coefficient of the monotonic spline fit, and the minimization produces the best monotonic spline fit in the least squares (LS) sense $DTT_{msp}$. The subscript i refers to the individual components of the corresponding vector quantity $\underline{DTT}$ with M being the total number of data points in the vector $\underline{DTT}$.

If the errors are not i.i.d. and in fact the covariance is known, the above statistic can be modified by suitably incorporating the covariance matrix of the errors in the likelihood functions. This yields the following expression for the test statistic:

$$T_m(DTT) = \frac{\exp[-1/2(\underline{DTT} - \overline{DTT})^t R^{-1}(\underline{DTT} - \overline{DTT})]}{\exp[-1/2(\underline{DTT} - DTTmsp)^t R^{-1}(\underline{DTT} - DTTmsp)]} \quad (9)$$

where R is the error covariance.

This test statistic can be simplified by taking the natural log of this expression to yield:

$$T_l(DTT) = (\underline{DTT} - DTTmsp)^t R^{-1}(\underline{DTT} - DTTmsp) - (\underline{DTT} - \overline{DTT})^t R^{-1}(\underline{DTT} - \overline{DTT}) \quad (10)$$

The hypothesis testing or detection can be accomplished by comparing this statistic to a threshold. However, the test statistic itself can be given an interpretation as follows.

It is observed that under the assumption of Gaussian noise and assuming no constraints on the LS fitting, the test statistic in Equation (10) has a central chi-square distribution under hypothesis H0 with n−1 degrees of freedom, where n is the size of the spline basis set. However, in the present case, there is a non-negativity constraint on the coefficients of the fit which makes the analytic computation of the distribution non-trivial. While this computation can still be obtained for the special case when the basis set is orthogonal (whence a weighted mixture of constant and chi-square distributions up to degree n−1 are obtained), it is much easier to obtain the cumulative distribution under hypothesis H0 from numerical experiments involving Monte Carlo trials for a variety of scenarios. This distribution yields a significance level of the monotonic spline fit relative to the constant fit and therefore is of interest for obtaining the corresponding significance level for any given value of the statistic $T_l$ as explained below.

Figure 2:
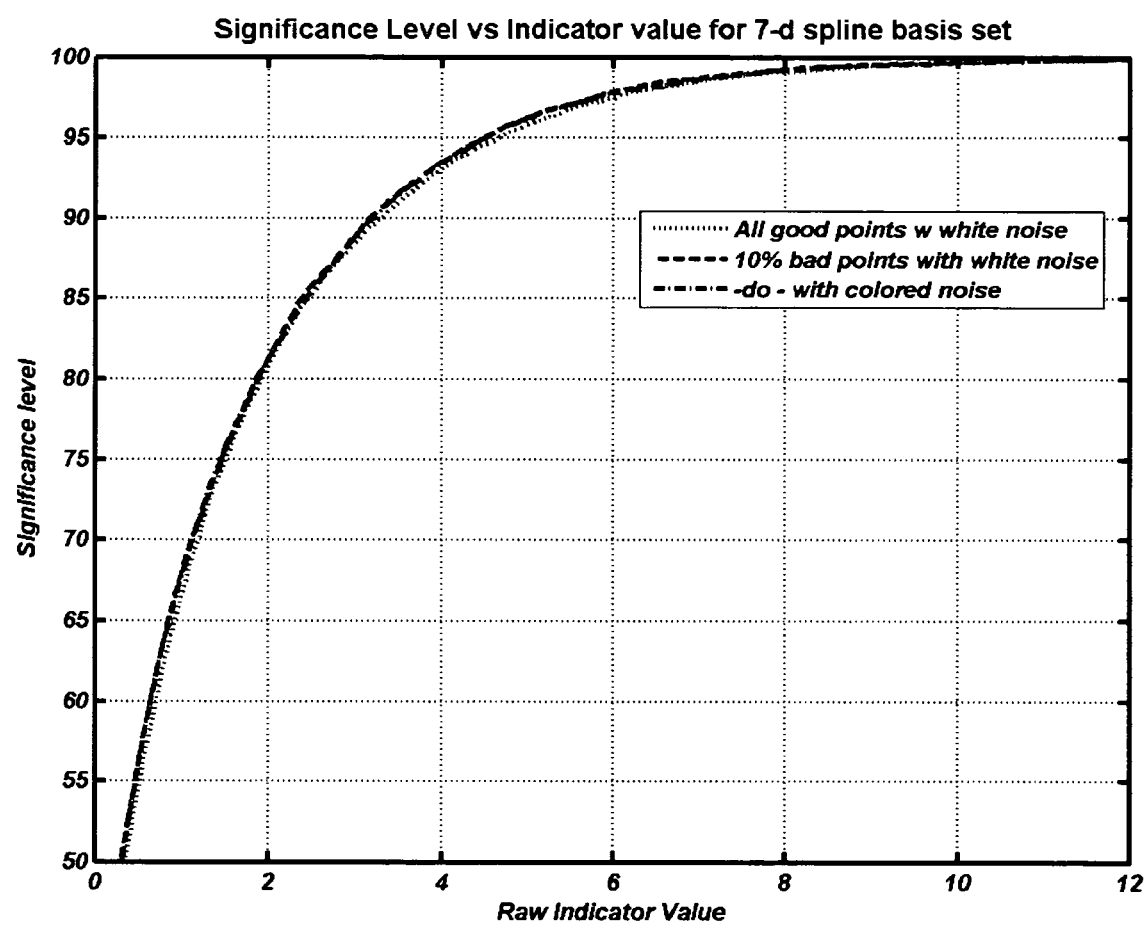
FIG. 2 shows the cumulative distribution of a statistic $T_l$ for a variety of scenarios using Monte Carlo runs of 10000 samples.
Figure 3:
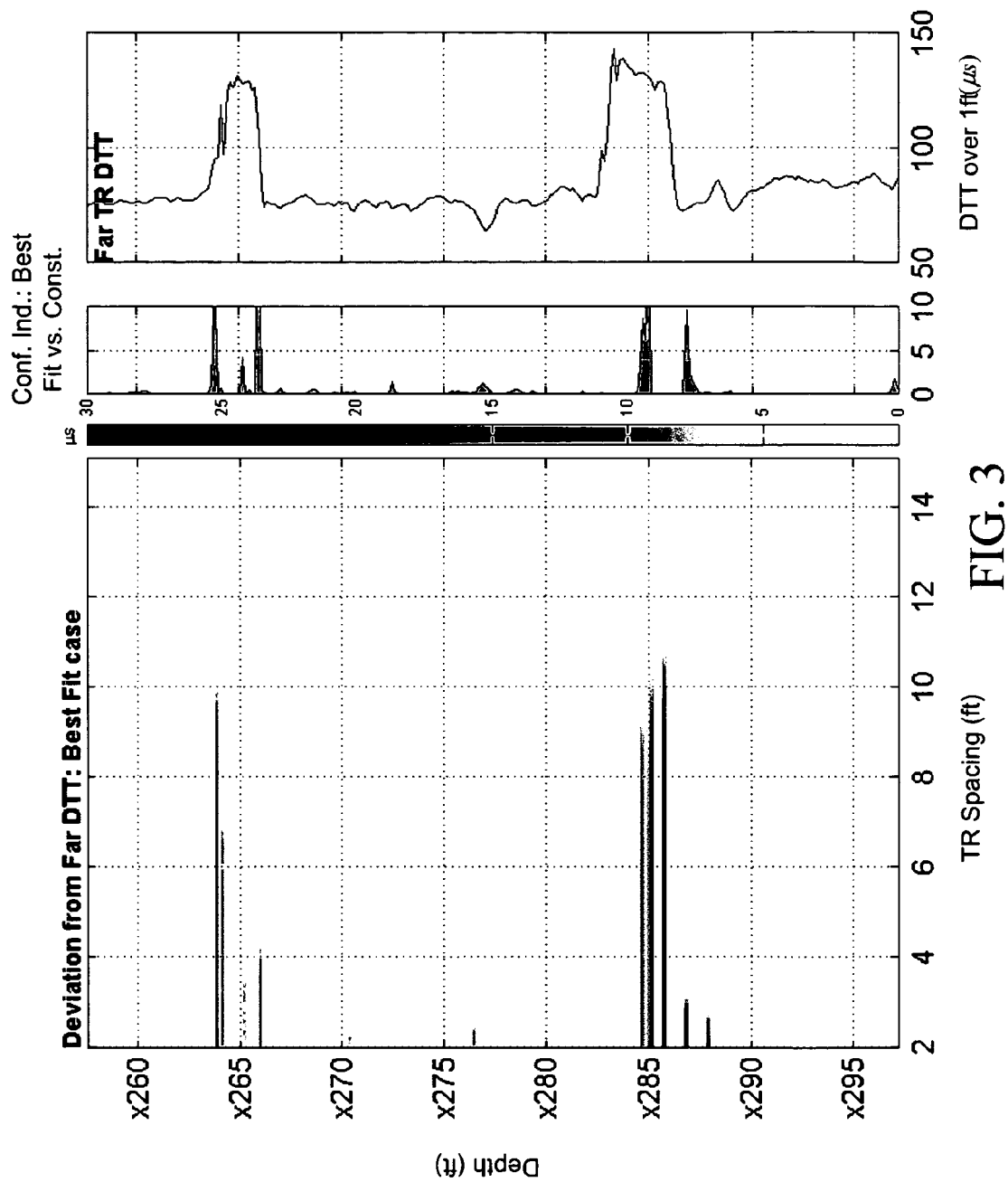
FIG. 3 is a composite plot showing on a left panel the best monotonic fit of the differential transit time data to a spline basis calculated as an offset from the far TR slowness and shown as a function of TR and depth.

FIGS. 2 and 3 show the cumulative distribution of the statistic $T_l$ for a variety of scenarios using Monte Carlo runs of 10000 samples. FIG. 2 shows the cases for white Gaussian noise with all data points retained, white noise with the removal of 10% of the points due to outlier (gross error) filtering, and white noise with different variances at each sensor. The cumulative distributions obtained are substantially in agreement which allows the choice of the significance level to be made by picking a corresponding value of $T_l$ for all scenarios which satisfy the assumptions of Gaussian error with a reasonable estimate of the variance. This desirable feature of constant significance level (or constant false alarm rate) testing allows the presetting of thresholds for detection/hypothesis testing and a consistent interpretation or normalization of the raw statistic $T_l$ so long as it is possible to uphold the error model used for developing the statistic.

FIG. 3 shows the significance level associated with the indicator $T_l$ obtained as in FIG. 2. The distribution is calculated for non-uniform noise and with 10% points removed as outliers using both 7-d and 6-d basis function sets.

Thus, a 95% significance level would correspond to a value of $T_l$=4.6 for n=7, i.e., given that H0 (constant slowness profile) is true, there is a 95% probability that $T_l$ has a value lower than this value of 4.6. Thus, any value of T over 4.6 would imply rejection of the constant slowness hypothesis in favor of the monotonic spline fit profile at a 95% significance level. The actual value corresponding to this level depends theoretically on the dimension of the basis spline fit and should be adjusted for other dimensions of n of that basis set. However the dimension of the basis set is an engineering parameter which is fixed in advance, so the value of $T_l$ for a desired significance level can be obtained and used for interpretation/normalization.

A similar interpretation can be asserted for the statistic developed assuming that the covariance or variance is not known. Again, while the analytic form is not easily obtained, the constant significance level property under the stated assumptions hold and the significance level can be pre-computed for any value of the statistic.

Now the indicator of a good fit is a measure of the statistical support of the data for the monotonic spline as compared to the constant fit and thus indicates how much to believe the altered profile output by RayProf as compared to the unaltered constant fit. It does not indicate the possible variability of profiles fitting the same data. Variability of profiles fitting the same data is better captured by an alternative characterization of the quality of fit including the maximal and minimal (collectively called extremal) fits which serve as the analog of the limits of the classical confidence interval. M. G. Kendall and A. Stuart, *The Advanced Theory of Statistics*, 4th Ed., London (1979). The extremal fits present the maximal and minimal deviation from a constant fit that is consistent with the data at a specific significance level. While this is more useful, it is a bit more cumbersome to display and use as compared to the single number of the confidence indicator. Nevertheless, for completeness, the extremal fits as offsets from the far field along with the confidence indicators are shown in FIGS. 3, 4, and 5 as applied to real field data.

FIG. 3 is a composite plot showing on the left panel the best monotonic fit of the DTT data to the spline basis calculated as the offset from the far TR slowness and shown in the image as a function of TR and depth. The far TR slowness is shown on the right panel while the corresponding confidence indicator is shown in the mid-panel.

Figure 4:
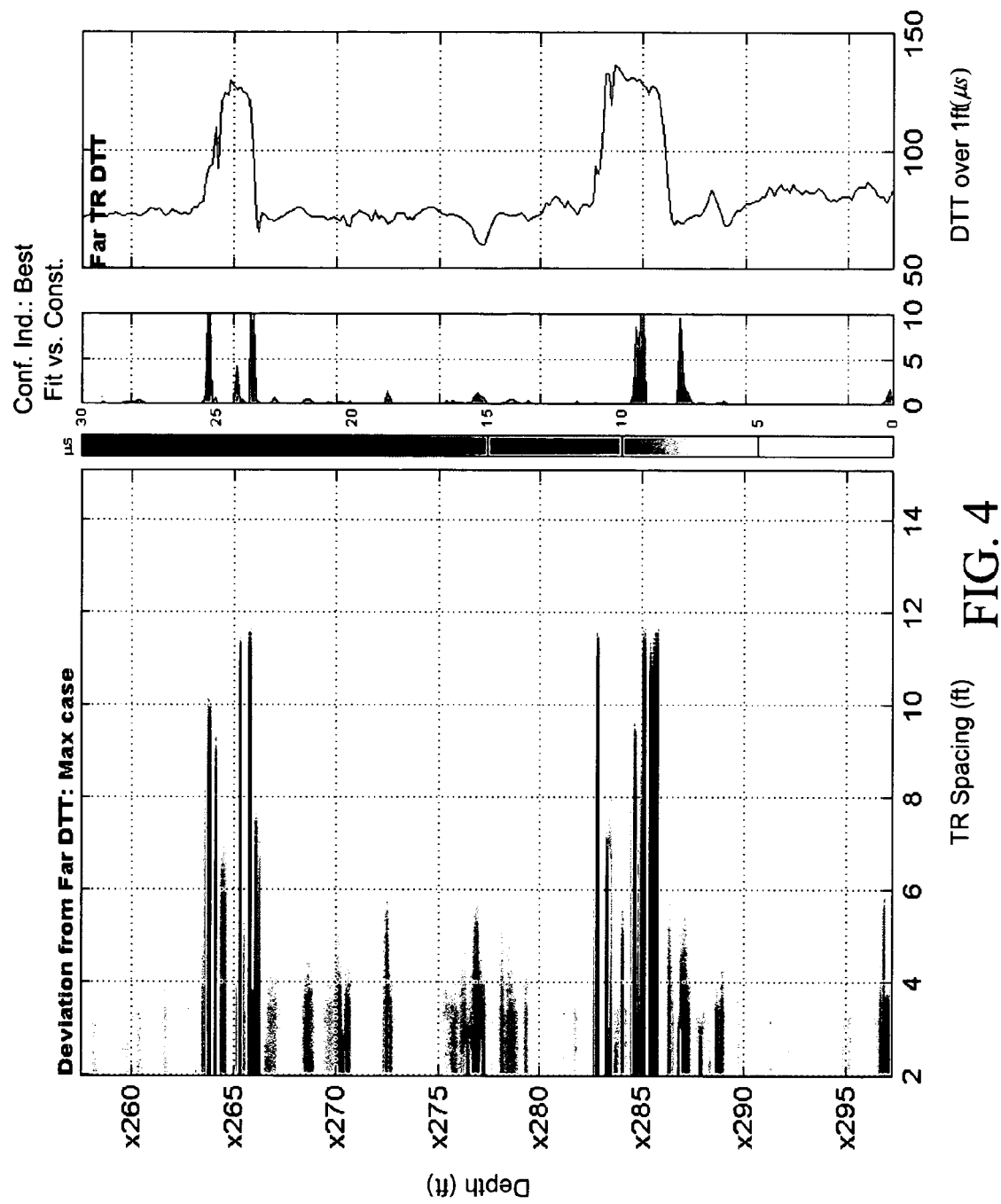
FIG. 4 is the same composite plot as FIG. 3, but illustrates the results for maximal deviation from a constant fit that is supported by the differential transit time data within a 95% significance level.

FIG. 4 shows the same composite plot as FIG. 3, but now shows the results for maximal deviation from the constant fit that is supported by the DTT data within a 95% significance level. The depths showing good agreement with the best-fit results as well as the minimal-deviation-from-constant results shown in FIG. 5 are the places where the supported variance of the fit is small and there is greater confidence.

Figure 5:
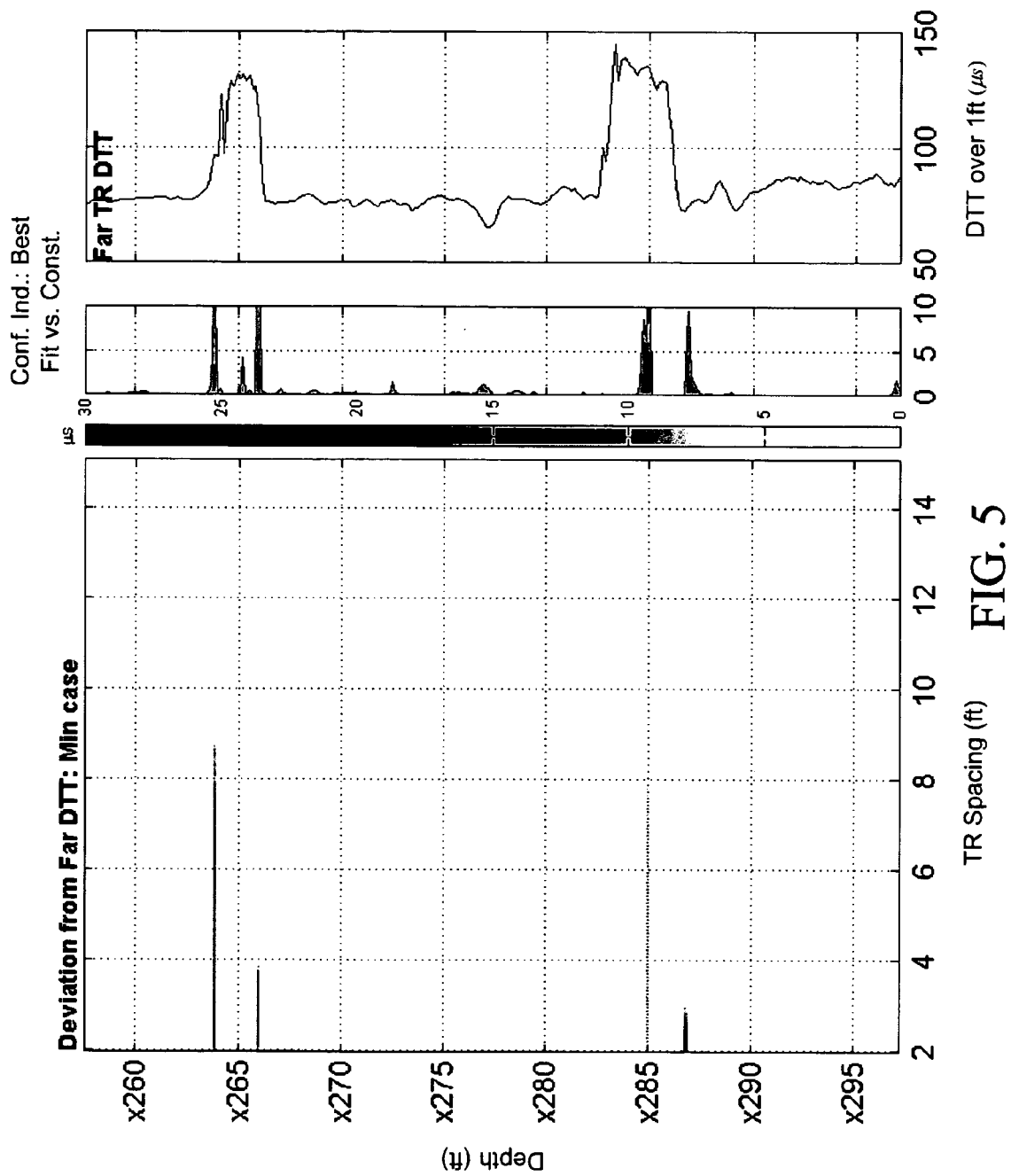
FIG. 5 is the same composite plot as FIG. 3, but shows the results for the minimal deviation from the constant fit that is supported by the differential transit time data within a 95% significance level.

FIG. 5 shows the same composite plot as FIG. 3 but now shows the results for the minimal deviation from the constant fit that is supported by the DTT data within a 95% significance level. The depths showing good agreement with the best-fit results as well as the maximal-deviation-from-constant results shown in FIG. 4 are the places where the supported variance of the fit is small and there is greater confidence.

The zones of high confidence are those where the difference of the extremal fits from the best fit is small.

Figure 6A:
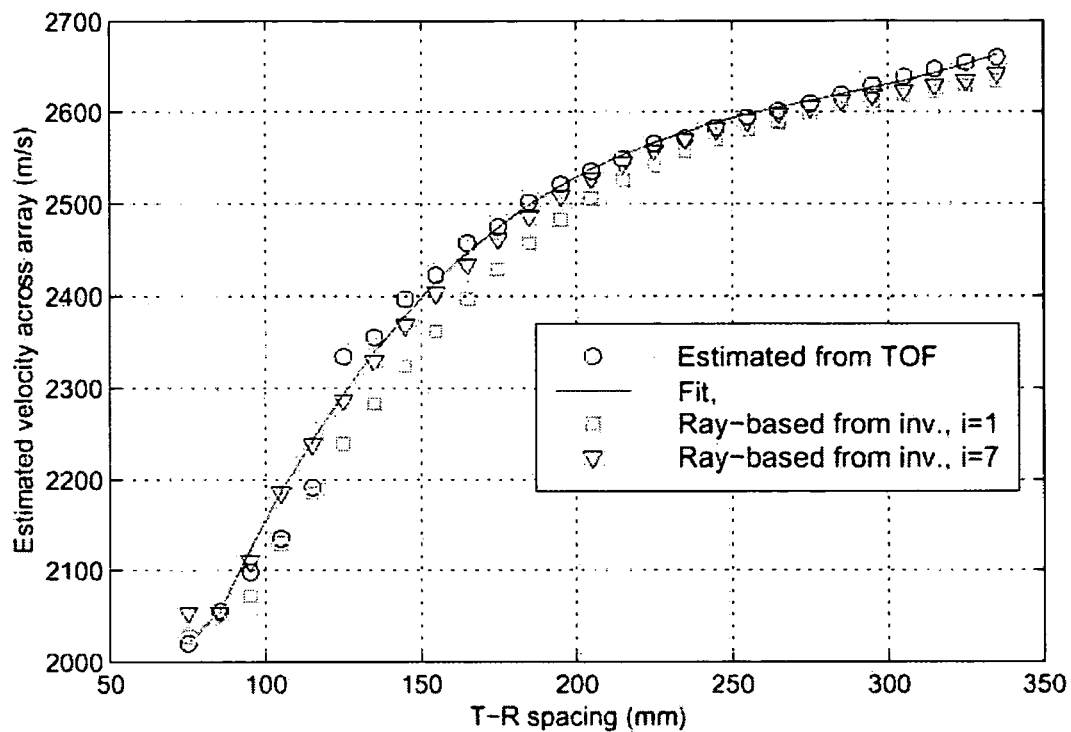
FIGS. 6a-6b present results of an inversion method according to one aspect of the present invention.
Figure 6B:
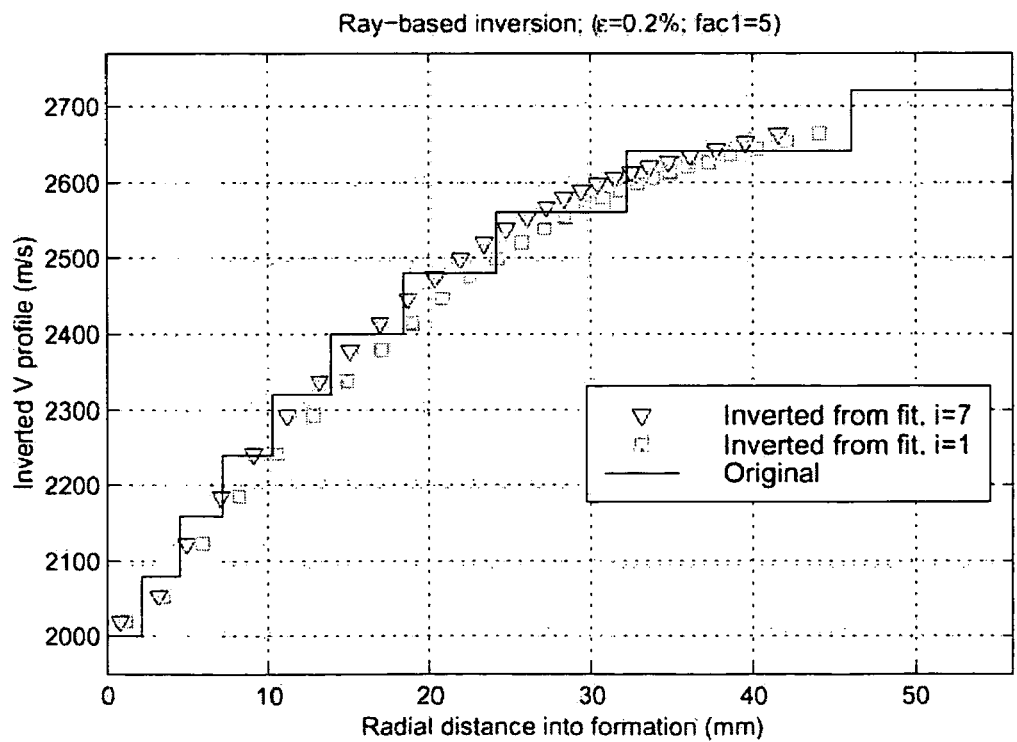

To validate the processes described above, synthetic data were generated using 2D finite-difference modeling. The model was composed of various layers with decreasing compressional slowness estimated with increasing depth into the formation. Transit times estimated from the synthetic waveforms were used as inputs to the inversion algorithm. FIGS. 6a and 6b present results of the inversion method. FIG. 6a presents the estimated velocity (reciprocal of slowness) across the receiver array (circles), its fit (solid line), and the derived velocities from the forward-propagated time of flights at the first and last (e.g. seventh) steps of the iteration scheme (triangles and squares). FIG. 6b presents a comparison between the original profile used to generate synthetic data (circles) and an inverted result at the first iteration (squares) and last iteration (triangles). The inversion algorithm recovers within acceptable error margins not only the layer thickness but also the associated slowness. Those of ordinary skill in the art having the benefit of this disclosure will note that this inversion process can be fully automated.

Figure 7:
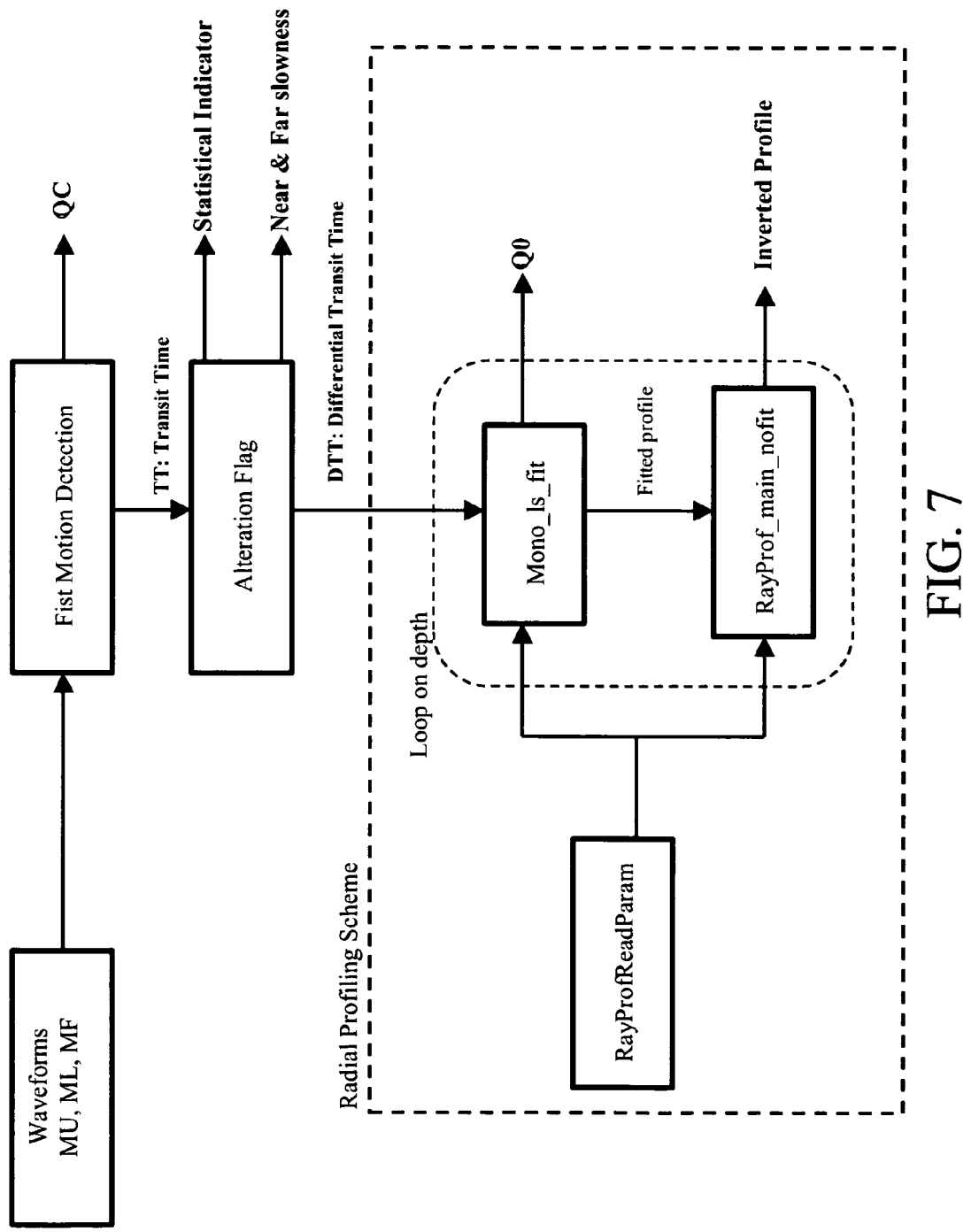
FIG. 7 is a diagram of representing one method or algorithm integrated into a general framework of radial profiling together with first motion detection and an alteration flag process.

FIG. 7 presents a diagram of one algorithm integrated in a general framework of the radial profiling together with the first motion detection and the alteration flag algorithm. This algorithm is based on the inversion of the differential transit time or DTT. Prior to generating these differential transit times, it may be preferable to compute the transit time of the compressional headwaves using a first detection algorithm. In the case of the present tool configuration (i.e. a logging tool 106 shown in FIG. 9), the transit time will be estimated for various transmitters: monopole lower (ML), monopole upper (MU), and far monopole (FM). These transit times become the input of the alteration algorithm that is providing alteration estimation (see, e.g., the '354 patent). This algorithm will output some statistical indicators together with an estimate of the near and far slowness log. The differential transit times are computed internally by this algorithm and will be used as an input of the profiling algorithm. For these reasons, the input DTT of the profiling are consistent with the assumptions and requirement made by the alteration estimation. These DTTs will be the input of the profiling algorithm.

First, a fitting function is implemented to fit the DTT as a function of TR. This fitting will allow filling the gap in the DTT due to the geometry of the tool used. Two outputs will be generated by this processing module (Mono_ls_fit); one will be a statistical indicator that will provide a confidence on the fit and an other one will be the interpolated DTT. This interpolated DTT is the input of the profiling code. The processing module (RayProf_main_nofit) will transform this function DTT versus TR into V versus TR. This inverted profile will be provided at each depth. Note that the input DTT may be depth aligned in order to assure that the DTT are reading the same location, ie. piece of rock, in the formation.

Figure 9:
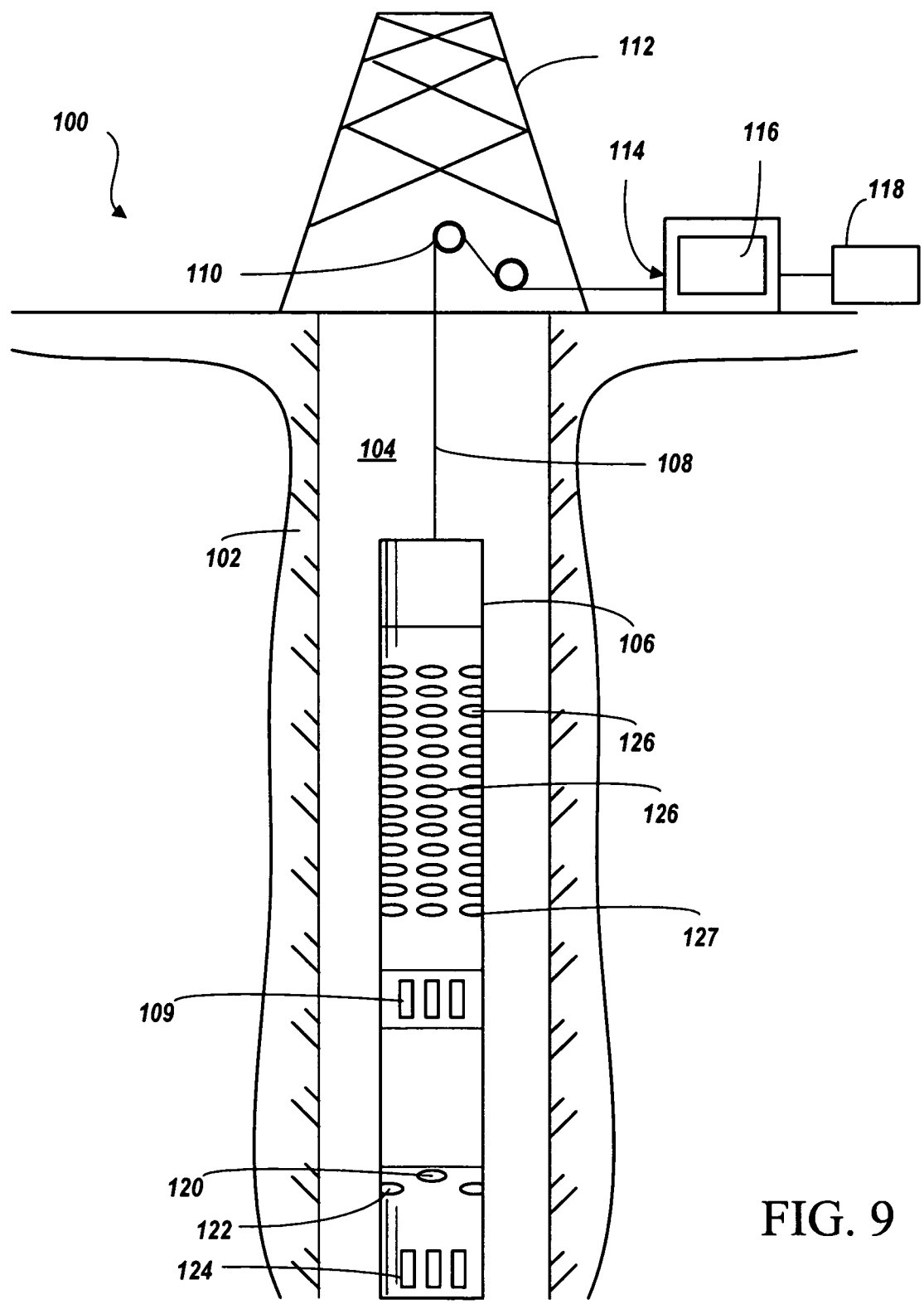
FIG. 9 is a diagram of a logging tool according to one aspect of the present invention.

Referring to FIG. 9, the data were recorded in a fast to intermediate formation 102 in a 12.25-in. open hole 104 by the logging tool 106. One of the improvements of this tool 106 is the use of a plurality of receivers and transmitters. In one embodiment, the receiver sonde has an array of thirteen receiver stations spaced six inches apart, with eight azimuthal sensors 126 at each axial station resulting in one-hundred and four independent waveforms for each transmitter firing. The use of a plurality of receivers and transmitters results in a better signal quality and adequate extraction of the various borehole signals over a wide frequency band. In addition, in this embodiment, there are three monopole sources and two dipole sources, each capable of firing pulses with different frequencies (monopole, frequencies of 1.5, 8, and 22 kHz). Two of the upper monopole transmitters 109 (MU) are located, respectively, one foot away from the receiver 126 array. A third monopole transmitter 124, which may be called the far transmitter or ML, is located eleven feet from the first receiver 127 of the array and allows for significant penetration of the signal into the formation 102. As explained previously, this new hardware—due in part to its plurality of transmitters located at different spacings and its multiplicity of receivers 126—is a suitable tool for sonic tomographic imaging. It is noted that the distances and number of receivers and transmitters noted in this example are provided as exemplary only and are not intended to be limiting; other configurations may be employed.

Figure 8:
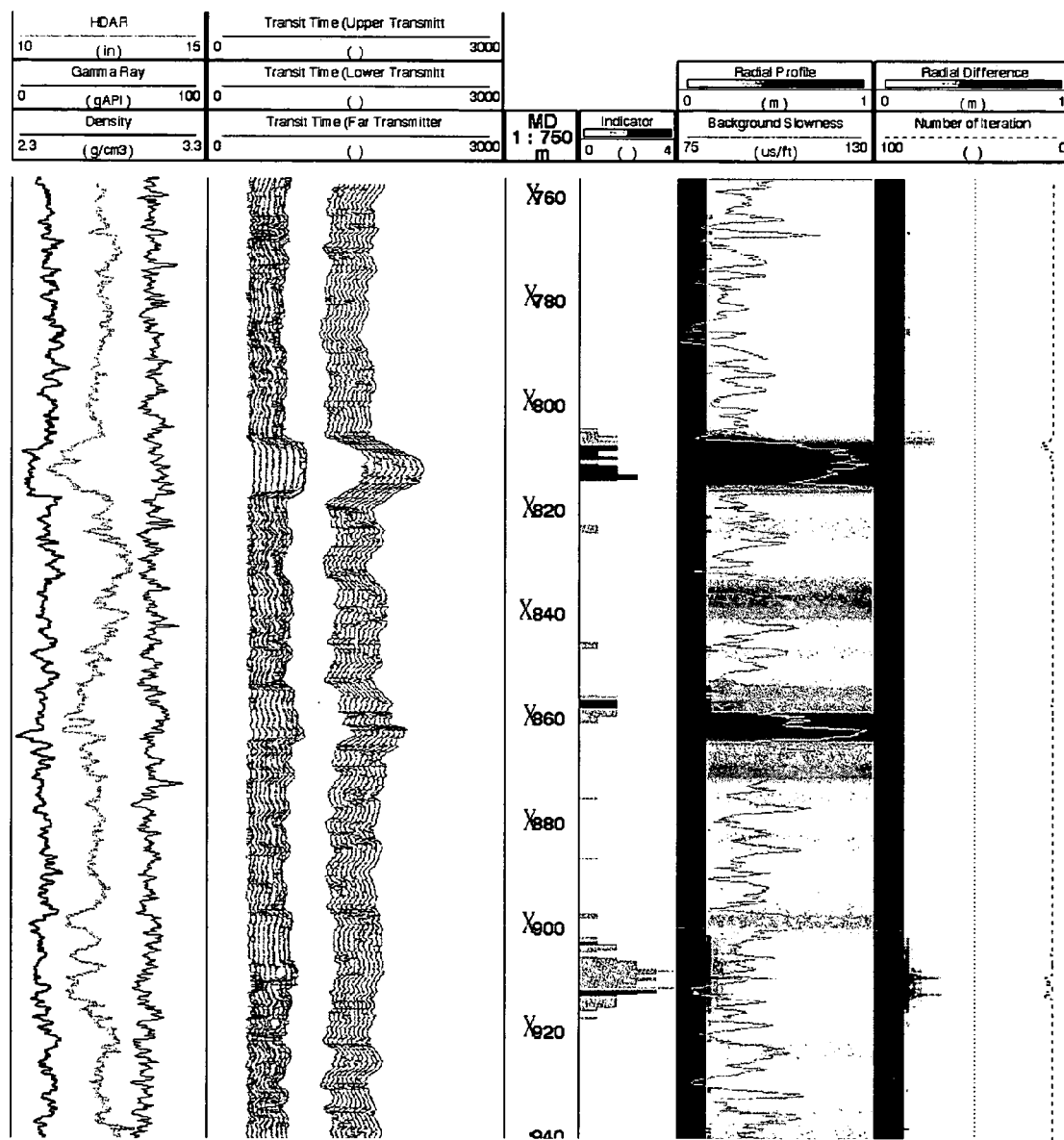
FIG. 8 presents results of a radial profiling method according to one aspect of the present invention.

FIG. 8 presents the results of the radial profiling algorithm presented above. There are five tracks in this figure. From left to right, the first track presents together the density, gamma ray and caliper logs. The second track presents the transit time detection obtained from the compressional waveforms recorded by the three monopole transmitters (e.g. transit time estimated from the recorded data). The third column presents the confidence indicator. The fourth column presents the inverted profile, and the fifth column represents the same information in terms of percentage of slowness variation. In this example, the algorithm has detected three major zones with radial slowness variation. Two of them, X800-X820 m and X900-X920 m, represent what is believed to be significant alterations that correlate with marked variations in the density logs and the gamma ray. Another zone at X860 m represents a smaller amount of alteration. The remainder of the log does not show much of alteration and correlates with the density and gamma ray logs. This correlated profiling can help in easily and efficiently detecting zones of alternation around the well bore and therefore provide potentially valuable information, to completion and well bore stability engineers, for example.

A methodology to obtain a 2D image of compressional slowness near-wellbore is presented. The inversion scheme is based on simple analytical formulae that make the algorithm extremely fast and robust and therefore possible to run at the well site with minimum user intervention. According to some aspects of the invention, the algorithm leverages unique characteristic of Schlumberger's logging tools in terms of sufficient TR coverage and a wide receiver aperture.

Turning again to FIG. 9, a logging system 100 is shown that may be used according to embodiments of the invention. The subsurface formation 102 is traversed by the borehole 104 which may be filled with drilling fluid or mud. The logging tool 106 is suspended from an armored cable 108 and may have optional centralizers (not shown). A cable 108 extends from the borehole 104 over a sheave wheel 110 on a derrick 112 to a winch forming part of surface equipment 114. Well known depth gauging equipment (not shown) may be provided to measure cable displacement over the sheave wheel 110. The tool 106 may include any of many well known devices to produce a signal indicating tool orientation. Processing and interface circuitry within the tool 106 amplifies, samples and digitizes the tool's information signals for transmission and communicates them to the surface equipment 114 via the cable 108. Electrical power and control signals for coordinating operation of the tool 106 are generated by the surface equipment 114 and communicated via the cable 108 to circuitry provided within the tool 106. The surface equipment includes a processor subsystem 116 (which may include a microprocessor, memory, clock and timing, and input/output functions—not separately shown), standard peripheral equipment (not separately shown), and a recorder 118. The tool 106 also includes a set of instructions that, when executed, provide a 2D or 3D image of formation slowness of an altered radial zone of the formation.

Figure 10:
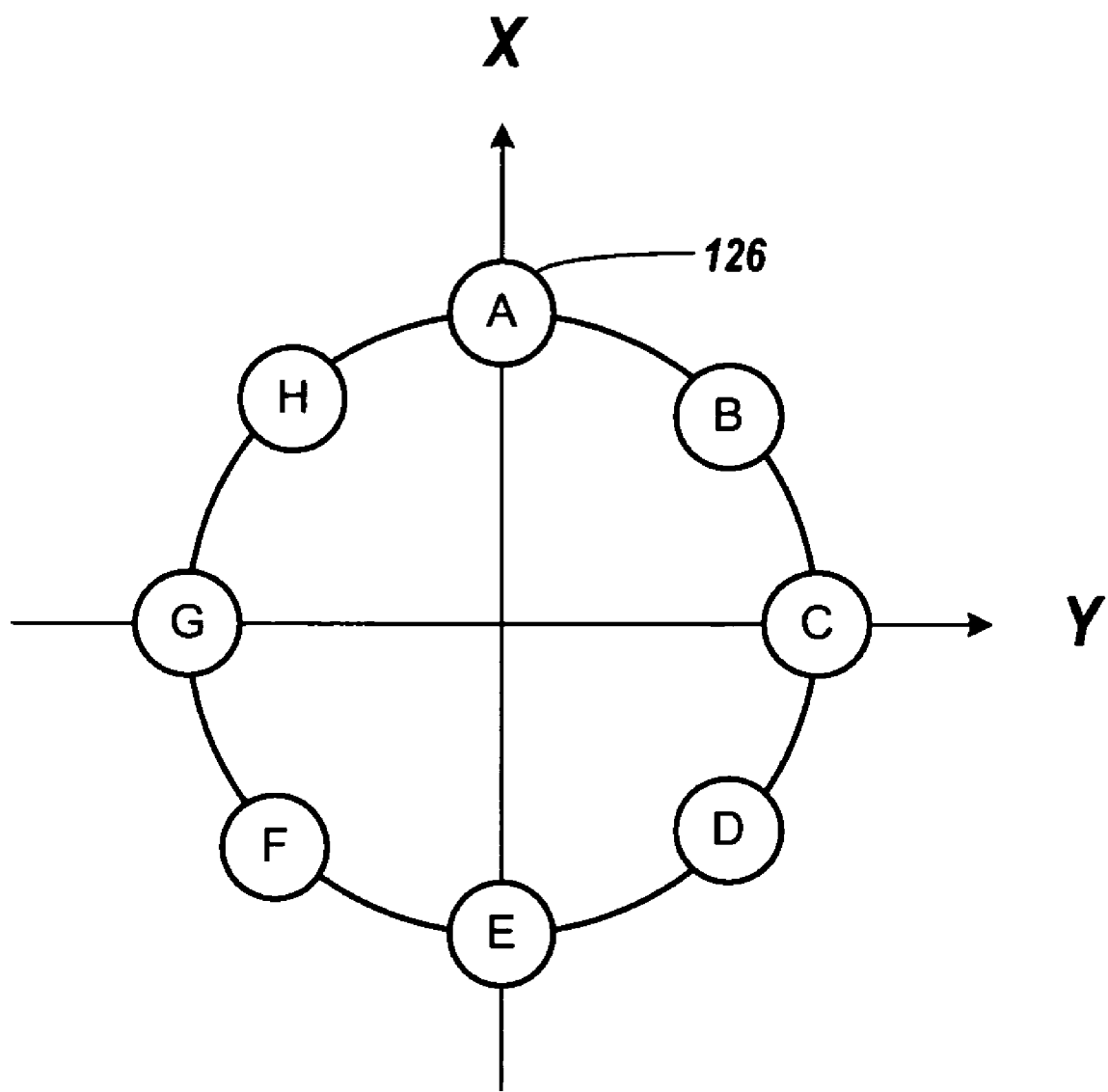
FIG. 10 is a simplified cross section of the logging tool of FIG. 10 according to one aspect of the present invention.

The logging tool 106 is representative of any logging device that may be used in accordance with principles described herein. It will be understood by those of skill in the art having the benefit of this disclosure that other suitable logging device, including LWD devices, can also be utilized. The logging tool 106 includes multi-pole transmitters such as crossed dipole transmitters 120, 122 (only one end of dipole 120 is visible in FIG. 9) and monopole transmitters 109 (close) and 124 (far) capable of exciting compressional, shear, Stoneley, and flexural waves. A plurality of receivers is arranged on the logging tool 106 spaced from the transmitters. For example, FIG. 9 shows thirteen spaced receiver stations, each receiver station comprising multiple receiver hydrophones 126 mounted azimuthally at regular intervals around the circumference of the tool 106. According to some embodiments, there may be eight receiver hydrophones 126 spaced at forty-five degree intervals around the tool 106 as shown in FIG. 10. The eight receiver hydrophones 126 are shown at locations A-H. According to the embodiment of FIG. 10, in an X-Y plane, an X-dipole component of a received signal may be obtained by subtracting the signals received at A and E (i.e., A-E), and a Y-dipole component can be obtained by subtracting the signals received at C and G (i.e., C-G). The other receivers may also be used to obtain X and Y-dipole components. With eight receivers 126 at each receiver station as shown in FIG. 9, there are a total of one-hundred and four receiver elements. Other configurations, such as a DSI (digital sonic imaging) tool with four receivers at each of eight receiver stations, are also possible.

Much of the discussion above and in the cited references refer to the inversion of the first arrival of the refracted compressional and shear head wave. One reason for inverting the first arrival of the refracted compressional head wave is that it exists for a large range of rock formations, unlike the shear wave that is present only for fast and intermediate formations. The methods and apparatus described above, however, are not limited to first arrivals of compressional head waves. The principles of the present invention may also be applied to invert the first arrival of the refracted shear head wave or other component coherent across an array. The shear arrival has applications related to the shear strength of the rock, which is also a property that is of importance to optimal design of well drilling, well completion and development.

Much of the discussion above refers to the generation of a 2D image of formation slowness as a function of radial depth into the formation. However, according to some aspects of the present invention, using the proper equipment, a 3D image of formation slowness may also be created. As discussed above with reference to FIGS. 9-10, the logging tool 106 may include eight receivers 126 at each of thirteen receiver stations. According to some aspects described above, the eight azimuthal signals at each receiver station are summed and recorded as a single signal. Therefore, there are only thirteen summed "receiver signals" to perform the radial profiling. The azimuthal information at each station is lost and a 2D image is created.

However, the principles described above may also be implemented to generate a 3D radial profile image. For example, the signals of all the receivers at each receiver station may not always be summed to produce one combined signal at each axial location along the tool. Instead, according to some aspects of the present invention, the azimuthal information is preserved. Accordingly, the signals from each of the receivers at a single azimuthal location (for example, each of the axially spaced receivers 126 at azimuthal location A (FIG. 11)) may be used to provide a radial profile for a single azimuthal location. The process may be repeated for each additional azimuthal location (i.e., for the thirteen receivers 126 at locations B, C, . . . , H) to create radial profiles at multiple azimuths (eight for the exemplary tool 106 in FIGS. 9-10). The radial profiles at multiple azimuths are then used to generate a 3D radial profile of formation slowness.

Therefore, according to one aspect of the present invention, at each azimuth of a logging tool, the axial receivers 126 at the same respective azimuthal locations are considered together. In the case of the logging tool 106 of FIGS. 9-10, signals from the thirteen axial receivers 126 at each azimuthal location (A-H) are grouped according to azimuthal location and used together. Accordingly, after an acoustic transmission, there are thirteen waveforms received for each azimuth. At each azimuth, radial profiling is performed according the principles described above. The radial profiling yields one profile for each azimuth (i.e., a map (r, z) at each angle theta). The profiles obtained at each azimuth may then be combined to yield a 3D image. If the logging tool rotates while acquiring data as it is pulled up the hole, the 3D imaging scheme as described above necessitates that the tool azimuth be transformed to the formation azimuth and that the corresponding transit time data be referred to the formation azimuth through interpolation techniques for instance.

One of skill in the art having the benefit of this disclosure will readily recognize that while the thirteen station, eight azimuthal configuration of FIGS. 9-10 facilitate a 3D image, many other configurations may also be used and the principle described herein for generating a 3D image is not limited to any one particular set of receiver stations and azimuthal placements.

What is claimed is:

1. A method of logging an earth formation surrounding a borehole, comprising:
    providing a logging device that is moveable through the borehole;
    transmitting sonic energy into the formation and receiving, at a plurality of transmitter-to-receiver spacings on the logging device, sonic energy that has traveled through the formation, and producing signals representative of the received sonic energy for the plurality of transmitter-to-receiver spacings;
    determining, from the signals, differential transit time data for selected receiver pairs at respective transmitter-to-receiver pair spacings;
    fitting the differential transit times data to a basis set of spline functions; and
    providing, from the spline fitted differential transit time, a continuous and quantitative radial profile image of formation slowness as a function of the radius of the borehole.

2. A method of logging an earth formation surrounding a borehole according to claim 1, wherein providing the continuous radial profile image of formation slowness comprises providing near, far, and intermediate formation slowness as a function of radius.

3. A method of logging an earth formation surrounding a borehole according to claim 1, wherein providing the continuous radial profile image of formation slowness comprises providing formation slowness as a function of radius at at least three radial locations.

4. A method of logging an earth formation surrounding a borehole according to claim 1, wherein providing the continuous radial profile image of formation slowness comprises providing formation slowness as a function of radius at regular or irregular radii intervals, the intervals ranging between about 0.1 and 36.0 inches.

5. A method of logging an earth formation surrounding a borehole according to claim 1, further comprising:
    determining, from the signals, differential transit times for selected receiver pairs at respective transmitter-to-receiver pair spacings.

6. A method of logging an earth formation surrounding a borehole according to claim 1, further comprising:
    determining, from the signals, differential transit time data for selected receiver pairs at respective transmitter-to-receiver pair spacings;
    fitting the differential transit times data to a basis set of spline functions;
    transforming spline fitted differential transit times versus transmitter-to-receiver spacings to an inverted profile of slowness as a function of borehole radius.

7. A method of logging an earth formation surrounding a borehole according to claim 6 wherein the transforming comprises an iterative inversion scheme.

8. A method of logging an earth formation surrounding a borehole according to claim 7 wherein the iterative inversion scheme comprises:
   (a) choosing an initial formation model with an initial radial formation layer thickness;
   (b) computing a time of flight for a wave traveling from a transmitter to a receiver based on the initial formation model;
   (c) computing a formation slowness for the initial model based on the time computed of flight;
   (d) measuring formation slowness;
   (e) comparing the computed formation slowness to the measured formation slowness;
      if the computed formation slowness is within a predetermined error tolerance,
         assigning the initial model as a final model and stopping the iterative scheme;
      if the computed formation slowness is outside the predetermined error tolerance:
         updating the initial formation model with a new radial formation layer thickness;
         repeating steps (b)-(e) for the updated formation model.

9. A method of logging an earth formation surrounding a borehole according to claim 1, further comprising:
   determining, from the signals, differential transit time data for selected receiver pairs at respective transmitter-to-receiver pair spacings;
      fitting the differential transit times data to a basis set of spline functions;
      transforming spline fitted differential transit times versus transmitter-to-receiver spacings to an inverted profile of slowness as a function of borehole radius;
   imaging the inverted profile.

10. A method of logging an earth formation surrounding a borehole according to claim 1, further comprising:
   (a) determining, from the signals, differential transit time data for selected receiver pairs at respective transmitter-to-receiver pair spacings;
   (b) computing a basis set of monotonic spline functions from the transmitter-to-receiver spacings corresponding to the differential transit time data;
   (c) computing a weighted least squares fit of the differential transit times data on a set of spline basis functions and weights based on a differential transit times variance;
   (d) checking coefficients of the least squares fit;
      if the coefficients are greater than or equal to zero, identifying the least squares fit as a best fit;
      if any of the coefficients are less than zero, repeating steps (c)-(d) until a non-negative condition of the coefficients is satisfied or a maximum number of iterations is triggered;
   (e) if a maximum number of iterations of steps (c)-(d) is triggered, applying a constant fit to the differential transit times data;
   (f) transforming fitted differential transit times versus transmitter-to-receiver spacings to an inverted profile of slowness as a function of borehole radius;
   (g) imaging the inverted profile.

11. A method of logging an earth formation surrounding a borehole according to claim 1, further comprising providing a continuous radial profile image of formation slowness in real time depth by depth.

12. A method of logging an earth formation surrounding a borehole according to claim 1, wherein providing a continuous radial profile image of formation slowness comprises providing a 3D image.

13. A method of logging an earth formation surrounding a borehole according to claim 12, wherein the providing a 3D image comprises:
   collecting multiple waveforms at each of multiple azimuthal locations;
   generating one radial profile for each azimuthal location;
   combining the profiles at each azimuthal location.

14. A method of logging an earth formation surrounding a borehole according to claim 13, wherein each one of the radial profiles comprises a slowness map (r, z) at each azimuthal angle, theta.

15. A method of logging an earth formation surrounding a borehole according to claim 1, wherein the slowness comprises compressional and shear slowness.

16. A method of logging an earth formation surrounding a borehole, comprising:
   providing a logging device that is moveable through the borehole;
   transmitting sonic energy into the formation and receiving, at a plurality of transmitter-to-receiver spacings on the logging device, sonic energy that has traveled through the formation;
   producing signals representative of the received sonic energy for the plurality of transmitter-to-receiver spacings;
   determining, from the signals, differential transit time data for the respective transmitter-to-receiver spacings;
   fitting the differential transit times data to a spline function profile;
   transforming spline fitted differential transit times versus transmitter-to-receiver spacings to an inverted profile of slowness as a function of borehole radius; and
   providing, from the inverted profile of slowness, a continuous and quantitative radial profile 2D image of formation slowness in an altered radial zone of the formation as a function of the radius of the borehole.

17. A method of logging an earth formation surrounding a borehole according to claim 16, wherein providing the 2D image of formation slowness comprises providing near, far, and intermediate formation slowness as a function of radius.

18. A method of logging an earth formation surrounding a borehole according to claim 16, wherein providing the 2D image of formation slowness comprises providing the image in real time.

19. A method of logging an earth formation surrounding a borehole according to claim 16, wherein providing the 2D image of formation slowness comprises providing formation slowness discreet length by discreet length as a function of radius.

20. A method of logging an earth formation surrounding a borehole according to claim 16, wherein providing the 2D image of formation slowness comprises providing formation slowness inch by inch as a function of radius.

21. A method of logging an earth formation surrounding a borehole according to claim 16, wherein providing the 2D image of formation slowness comprises providing formation slowness discreet radius length by discreet radius length at multiple depths.

22. A method of logging an earth formation surrounding a borehole according to claim 16, wherein the transforming comprises:
   (a) starting with an initial radially-layered formation model with an initial profile given by an inverted profile resulting from the transforming;

(b) computing a time of flight for a wave traveling from a transmitter to a receiver based on the initial formation model;

(c) computing a formation slowness for the initial model based on the time computed of flight;

(d) measuring formation slowness;

(e) comparing the computed formation slowness to the measured formation slowness;

if a difference between the computed formation slowness and the measured formation slowness is within a predetermined error tolerance, assigning the initial model as a final model and stopping further iterations;

if the difference between the computed formation slowness and the measured formation slowness is outside the predetermined error tolerance:

updating the initial formation model with a new radial formation layer thickness;

repeating steps (b)-(e) for the updated formation model;

(f) repeating steps (a)-(e) for a plurality of radial layers.

23. A method of profiling a formation traversed by a borehole, comprising:

logging near borehole formation slowness;

logging far field formation slowness;

logging intermediate formation slowness as a function of radius by producing signals representative of received sonic energy for a plurality of transmitter-to-receiver spacings;

determining, from the signals, differential transit time data for the respective transmitter-to-receiver spacings;

fitting the differential transit times data to a spline function profile;

transforming spline fitted differential transit times versus transmitter-to-receiver spacings to an inverted profile of slowness as a function of borehole radius; and providing from the inverted profile of slowness, a continuous and quantitative radial profile 2D image of formation slowness as a function of the radius of the borehole.

24. A method of profiling a formation traversed by a borehole according to claim 23, wherein the logging intermediate formation slowness as a function of radius comprises logging a plurality of formation slowness values of the formation at radii between the near and far formation slownesses.

25. A method of profiling a formation traversed by a borehole according to claim 23, wherein the logging intermediate formation slowness as a function of radius comprises logging slowness variation radially between the near and far fields.

26. A method of profiling a formation traversed by a borehole according to claim 23, wherein the logging intermediate formation slowness as a function of radius comprises logging slowness variation radially at spaced intervals between the near and far fields.

27. A method of profiling a formation traversed by a borehole according to claim 23, wherein the logging intermediate formation slowness as a function of radius comprises logging slowness variation in an altered zone of the formation.

28. A method of profiling a formation traversed by a borehole according to claim 23, further comprising logging intermediate formation slowness as a function of radius depth by depth at a plurality of depths.

29. A method of profiling a formation traversed by a borehole according to claim 23, further comprising generating a 2D image of slowness as a function of radius in real time at a selected depth.

* * * * *